United States Patent
Rodenbeck

(10) Patent No.: US 8,176,958 B2
(45) Date of Patent: May 15, 2012

(54) MAGNETO-RHEOLOGICAL ELASTOMER WHEEL ASSEMBLIES WITH DYNAMIC TIRE PRESSURE CONTROL

(75) Inventor: Phillip David Rodenbeck, Valparaiso, IN (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 445 days.

(21) Appl. No.: 12/485,343

(22) Filed: Jun. 16, 2009

(65) Prior Publication Data

US 2010/0314015 A1 Dec. 16, 2010

(51) Int. Cl.
*B60C 23/04* (2006.01)
(52) U.S. Cl. .................................. 152/418; 152/415
(58) Field of Classification Search .............. 152/415, 152/418, 151, 158, 152.1; 340/442; 73/146.2
See application file for complete search history.

(56) References Cited

U.S. PATENT DOCUMENTS

| | | | |
|---|---|---|---|
| 1,704,002 A * | 3/1929 | Holmes | 152/151 |
| 2,981,305 A * | 4/1961 | Reed | 152/418 |
| 3,377,221 A | 4/1968 | Hawkes | |
| 5,492,312 A | 2/1996 | Carlson | |
| 5,607,996 A | 3/1997 | Nichols et al. | |
| 5,609,353 A | 3/1997 | Watson | |
| 5,816,587 A | 10/1998 | Stewart et al. | |
| 5,878,851 A | 3/1999 | Carlson et al. | |
| 5,974,856 A | 11/1999 | Elie et al. | |
| 6,460,662 B2 | 10/2002 | Niaura et al. | |
| 6,842,671 B2 * | 1/2005 | Tropper | 701/1 |
| 6,860,146 B2 | 3/2005 | Dufournier | |
| 6,989,065 B2 | 1/2006 | Tabor et al. | |
| 7,018,102 B1 | 3/2006 | Brotz | |
| 7,044,180 B2 | 5/2006 | Rhyne et al. | |
| 7,086,507 B2 | 8/2006 | Hitchcock et al. | |
| 7,137,634 B2 | 11/2006 | Oh | |
| 7,261,834 B2 | 8/2007 | Fuchs et al. | |
| 2003/0106626 A1 | 6/2003 | Steinke | |
| 2005/0205364 A1 | 9/2005 | Browne et al. | |
| 2008/0066842 A1 | 3/2008 | Steinke et al. | |
| 2009/0314404 A1 * | 12/2009 | Rodgers et al. | 152/209.5 |

FOREIGN PATENT DOCUMENTS

| | | | |
|---|---|---|---|
| DE | 4201691 A1 * | 7/1993 | |
| JP | 62173307 A * | 7/1987 | |
| KR | 2003097218 A * | 12/2003 | |
| KR | 2007115424 A * | 12/2007 | |

* cited by examiner

*Primary Examiner* — Kip T Kotter
(74) *Attorney, Agent, or Firm* — Dinsmore & Shohl LLP

(57) ABSTRACT

A wheel assembly includes a magneto-rheological elastomer (MRE) assembly disposed between a rim and a tire assembly. The MRE assembly may be configured to adjust a tire pressure within a chamber between the rim and the tire assembly when a magnetic field is applied to the MRE assembly.

20 Claims, 6 Drawing Sheets

MAGNETO-RHEOLOGICAL ELASTOMER WHEEL ASSEMBLIES WITH DYNAMIC TIRE PRESSURE CONTROL

TECHNICAL FIELD

The present invention generally relates to wheel assemblies for vehicles and, more specifically, to wheel assemblies with active magneto-rheological apparatuses for dynamic tire pressure control.

BACKGROUND

The efficiency of a vehicle depends in part on the tire pressure of its wheel assemblies. In average conditions, an increase in tire pressure may swell the tire causing a decrease in its contact area with the road. This in turn may improve rolling resistance and increase the fuel efficiency of the vehicle. However, additional environmental conditions such as external temperature, driving speed and/or surface traction may further influence the desired tire pressure. For example, tire pressure is known to decrease in cold air and increase in warm air. This may require the addition or removal of air from a tire to maintain the vehicle's target efficiency.

Furthermore, when a tire begins to leak, the tire pressure may continuously decrease causing a downward trend in the handling of the vehicle. The regression of the tire performance may require immediate attention depending on the speed of the leak.

Accordingly, a need exists for alternative wheel assemblies with dynamic tire pressure control.

SUMMARY

In one embodiment, a wheel assembly may include a magneto-rheological elastomer (MRE) assembly disposed between a rim and a tire assembly. The MRE assembly may be configured to adjust a tire pressure within a chamber between the rim and the tire assembly when a magnetic field is applied to the MRE assembly.

In another embodiment, a wheel assembly may include a rim, a tire assembly disposed around the rim, and a magneto-rheological elastomer (MRE) assembly. The MRE assembly may be disposed between the rim and the tire assembly such that when the MRE assembly is subjected to a magnetic field, the MRE assembly may exert a force on the tire assembly.

In yet another embodiment, a vehicle with a dynamically adjustable tire pressure system may include a wheel assembly having a rim, a tire assembly and a magneto-rheological elastomer (MRE) assembly. The MRE assembly may be between the rim and the tire assembly, and include an electromagnet and an MRE pillar. A feedback control system may communicate with a condition sensor and the MRE assembly such that when the feedback control system receives feedback signals from the condition sensor that a tire pressure is outside a preset range, the feedback control system may produce a control signal to control an output of the electromagnet.

These and additional features provided by the embodiments of the present invention will be more fully understood in view of the following detailed description, in conjunction with the drawings.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION

Figure 1:
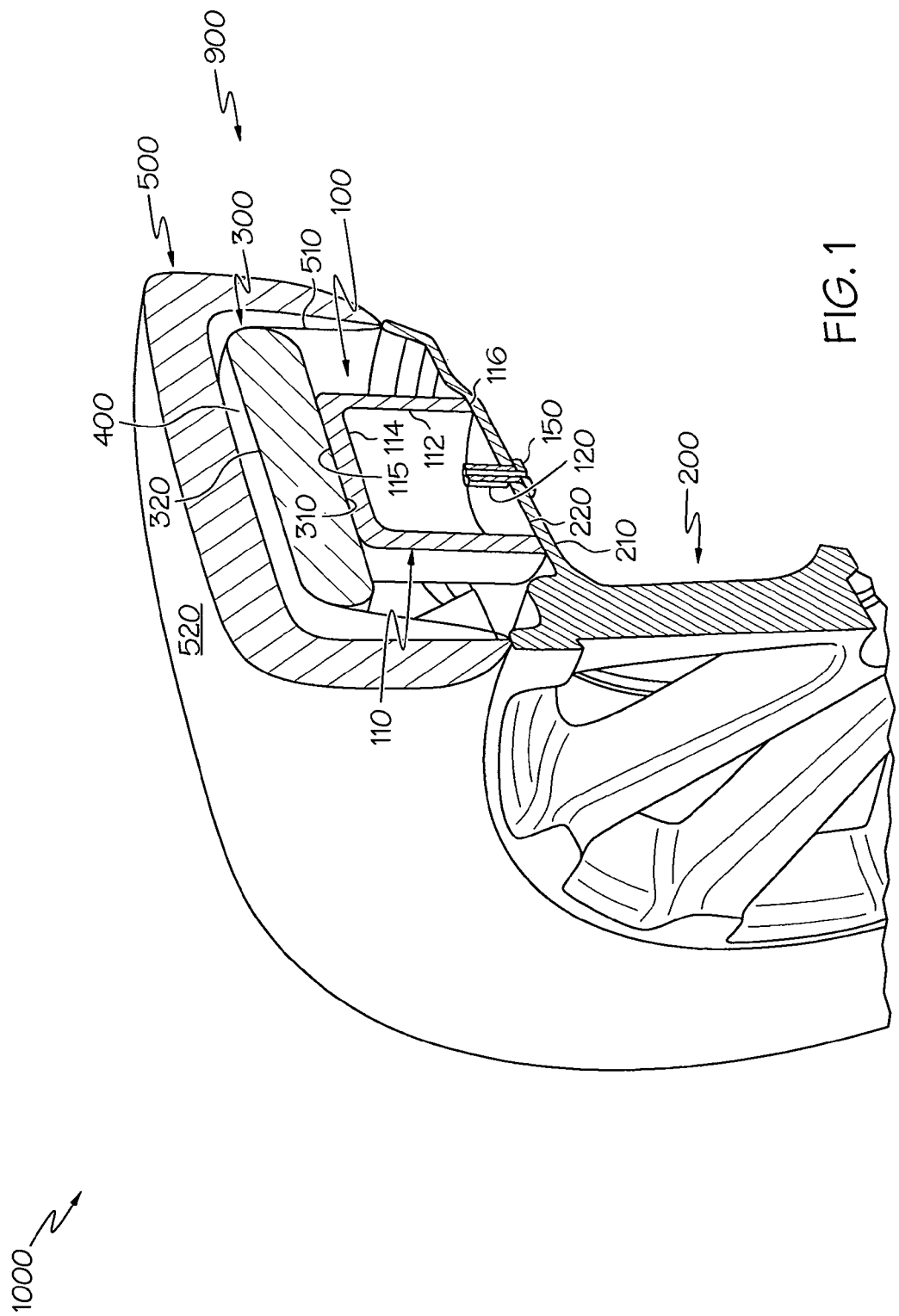
FIG. 1 depicts a cross section of a wheel assembly with an MRE assembly according to one or more embodiments shown and described herein.

Magneto-rheological elastomers (MREs) are state-of-the-art elastomagnetic composites comprised of magnetic particles embedded in an elastomer matrix. FIG. 1 generally depicts one embodiment of a wheel assembly with an MRE assembly. The wheel assembly generally comprises a tire assembly having an outer tire and an inner tire with a chamber in between. An MRE assembly with an MRE pillar is disposed between the rim (or wheel) and the tire assembly. When an electromagnet produces a magnetic field, the MRE pillar becomes stiff which in turn exerts added pressure on the tire assembly and/or increases the tire pressure within the chamber. A magnetic shield may also be disposed around the electromagnet on the interior of the rim. The wheel assembly 1000 having an MRE assembly 100 will be discussed in more detail herein.

Figure 2:
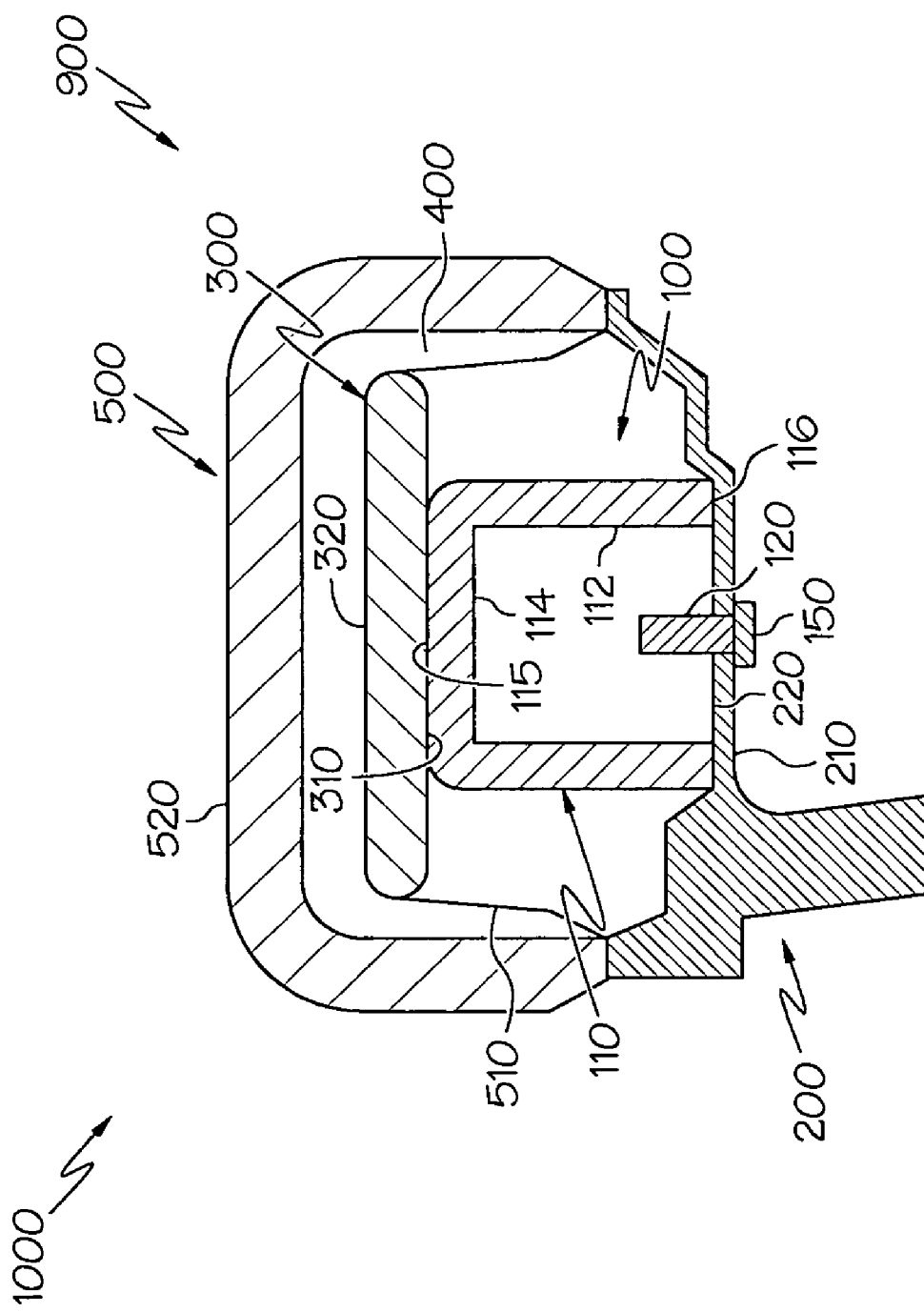
FIG. 2 depicts a cross section of a wheel assembly with an MRE assembly according to one or more embodiments shown and described herein.
Figure 5:
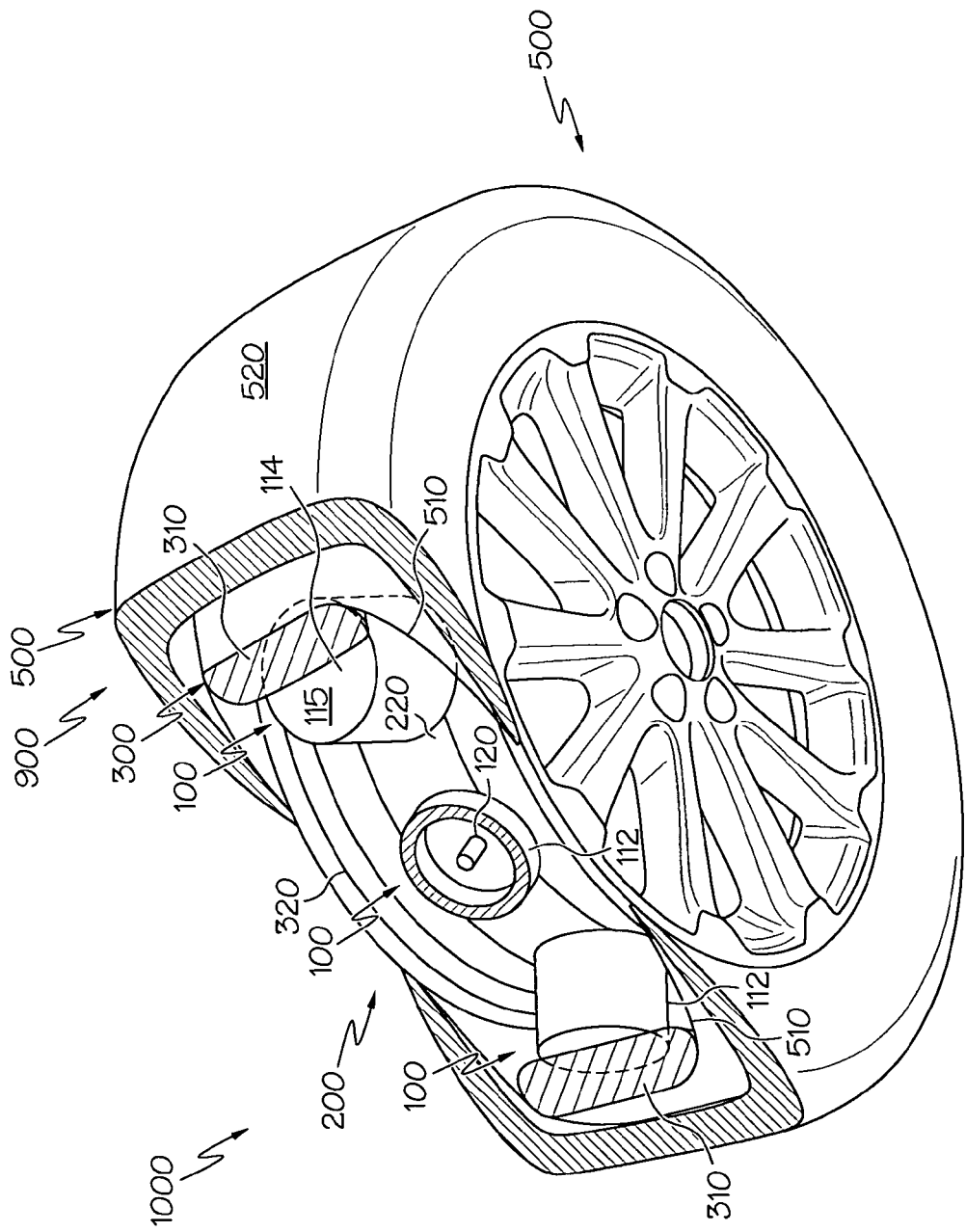
FIG. 5 depicts a wheel assembly comprising multiple MRE assemblies according to one or more embodiments shown and described herein.
Figure 6:
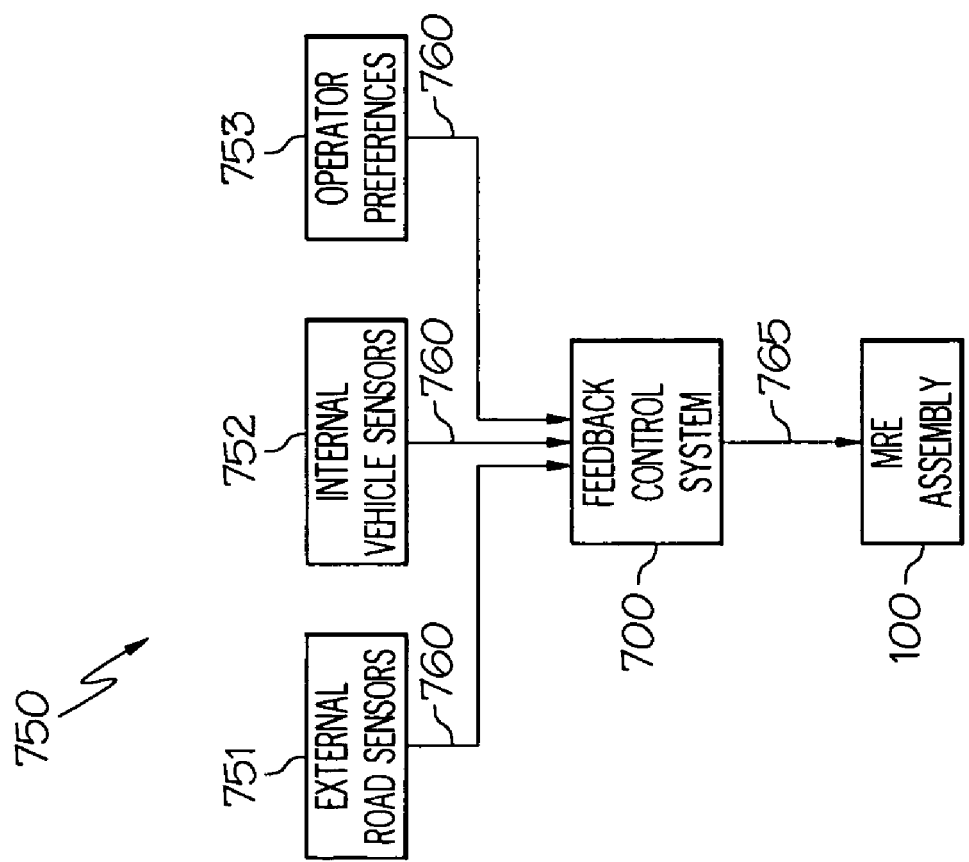
FIG. 6 depicts a logistical flowchart of a feedback control system according to one or more embodiments shown and described herein.

Referring to FIGS. 1, 2 and 5, an MRE assembly 100 utilized in a wheel assembly may comprise an MRE pillar 110. In one embodiment, a side wall 112 of the MRE pillar 110 may be substantially cylindrical in shape forming a hollow cavity. A top edge or contact portion 114 of the MRE pillar 110 may sit atop sidewall 112 and have an oppositely facing surface (such as contact surface 115) configured to engage an inner tire 300 of a tire assembly 900 as will be discussed later herein. In one embodiment, the top edge 114 may comprise a substantially flat and continuous surface. In another embodiment, the top edge 114 may simply comprise the upper portion of the side wall 112 such that the MRE pillar remains open and the contact surface 115 is a substantially ring-like shape.

A base 116 of the MRE pillar 110 may be configured to engage a first surface 220 of the wheel or rim 200. In one embodiment, the base 116 may comprise a rounded surface that mirrors the contours of the first surface 220 of the rim 200. In the alternative, the base 116 may comprise a substantially flat surface or any other configuration that may aid in engagement with the first surface 220 of the rim 200.

The MRE pillar 110 may comprise an alternative shape that is not substantially cylindrical. In one embodiment, the MRE pillar 110 may comprise a substantially conical shape such that the MRE pillar 110 comprises a wide base 116 about the rim 200 and a narrow top edge 114 about the inner tire 300. In another embodiment, the MRE pillar 110 may comprise a square or rectangular shape or otherwise have a finite number of definable walls such as three, four or five. Furthermore, the MRE pillar 110 may comprise a substantially solid piece having no internal cavity. In the alternative, the MRE pillar 110 may comprise multiple cavities about its structure.

The stiffness of the MRE pillar 110 may adjust in response to an adjustable magnetic field such that the MRE assembly 100 may have an adjustable stiffness. Particularly, the MRE pillar 110 may comprise ferromagnetic particles (e.g., iron particles) suspended in an elastomer (e.g., rubber). When the MRE pillar 110 is not subjected to a magnetic field, the MRE pillar 110 may behave like any other rubber. For example, the MRE pillar 110 may be deformable and pliable when not subjected to a magnetic field. However, when the MRE pillar 110 is subjected to a magnetic field, the suspended ferromagnetic particles may align with one another and form rigid substructures that may thereby increase the stiffness and rigidity of the overall MRE pillar 110. The change in stiffness of the MRE pillar 110 may be proportional to the magnetic field. Thus, the greater the magnetic field applied to the MRE pillar 110, the more stiff the MRE pillar 110 may become. The adjustability of the stiffness may further depend on the composition of the MRE pillar 110. In one exemplary embodiment, ferromagnetic particles may comprise about 27% of the elastomer. However, those skilled in the art will appreciate that the size, shape and distribution of the ferromagnetic particles inside the elastomer may further influence the overall stiffness, and change in stiffness, of the MRE pillar 110.

The MRE pillar 110 may comprise one MRE material, a combination of MRE materials, or a combination of MRE and non-MRE materials. For example, in one embodiment, the contact surface 115 of the top edge 114 on the MRE pillar 110 may comprise a metal or plastic to engage the MRE pillar surface 310 of the inner tire 300. Likewise, the base 116 of the MRE pillar may comprise non-MRE material to engage the first surface 220 of the rim 200. In another embodiment, the MRE pillar 110 may comprise alternating or varying layers or sections of MRE material and non-MRE material.

Referring to FIGS. 1-3 and 5, the MRE assembly 100 may further comprise an electromagnet 120 proximate the MRE pillar 110. The electromagnet 120 may be capable of producing or outputting an adjustable magnetic field such that the MRE pillar 110 may stiffen in response to the magnetic field produced. In one exemplary embodiment, as discussed above, the MRE pillar 110 may comprise a substantially hollow and cylindrical side wall 112 with a top edge 114 and a base 116. An electromagnet 120 may be disposed internally within the MRE pillar 110 such that a relatively symmetrical magnetic field may be applied to the MRE pillar 110. A relatively symmetrical magnetic field may ensure a substantially uniform or consistent change in stiffness throughout the MRE pillar 110. In one embodiment, as depicted in FIGS. 1, 2 and 5, the electromagnet 120 may be disposed proximate the base 116 of the MRE pillar 110, and may be secured to the rim 200.

In another embodiment, the electromagnet 120 may be disposed at any location proximate to the MRE pillar 110. For example, where the MRE pillar 110 comprises a substantially solid cylinder, the electromagnet may be disposed external the MRE pillar 110 proximate the base 116 of the MRE pillar 110 and the rim 200.

In yet another embodiment, multiple electromagnets 120 may be disposed about the MRE pillar 110. The electromagnets 120 may be disposed internal the MRE pillar 110, external the MRE pillar 110 or a combination thereof. Where multiple electromagnets are incorporated into the MRE assembly 100, the electromagnets may be disposed symmetrically about the MRE pillar 110 so that a substantially uniform magnetic field is applied to the MRE pillar 110. In another embodiment, some or all of the electromagnets 120 may be relatively biased to one section of the MRE pillar 110 such that one section of the MRE pillar 110 undergoes a greater change in stiffness with respect to the rest of the MRE pillar 110. For example, multiple electromagnets may be disposed internal the MRE pillar 110 with only a single electromagnet being disposed external the MRE pillar 110. In such an embodiment, the MRE pillar may be relatively more stiff about its internal surface compared to its external surface when all electromagnets 120 produce a magnetic field. This may help provide rigidity to the MRE pillar while maintaining flexibility about the engagement of the MRE pillar 110 with the MRE pillar surface 310 of the inner tire 300 and the first surface 220 of the rim 200.

Figure 4:
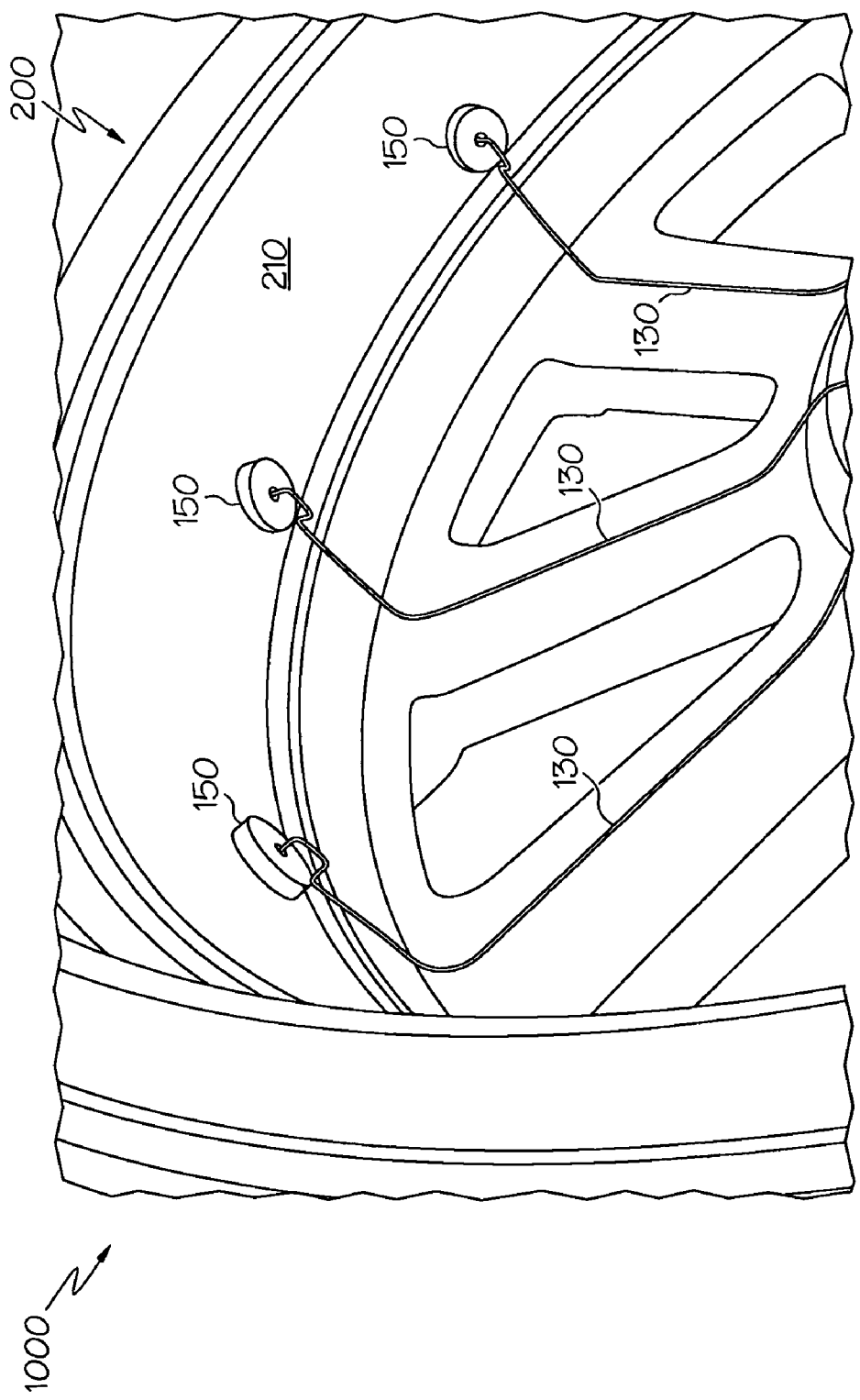
FIG. 4 depicts magnetic shields disposed about a second surface of a rim according to one or more embodiments shown and described herein.

Referring to FIGS. 1, 2, and 4, a magnetic shield 150 may surround or partially surround the electromagnet(s) 120 and/or the MRE assembly 110 to avoid or limit electrical interference with neighboring components. In one embodiment, the magnetic shield 150 may surround the periphery of the electromagnet 120 about a second surface of the wheel or rim 210. The second surface 210 of the rim 200 may be the surface facing the center of the wheel assembly 1000. In such an embodiment, the magnetic shield 150 may thereby limit or prevent the magnetic field produced by the electromagnet 120 from affecting other components disposed about or proximate to the wheel assembly 1000.

As best seen in FIGS. 1, 2 and 5, the MRE assembly 100 may be integrated into a wheel assembly 1000. The wheel assembly 1000 may comprise the rim 200 and the tire assembly 900 (e.g., illustrated as the inner tire 300, the outer tire 500 with a chamber 400 disposed between the outer tire 500 and a chamber facing surface 320 of the inner tire 300). The rim 200 may comprise a substantially circular body comprising a first surface 220 facing outwardly and a second surface 210 facing inwardly. The rim 200 may comprise a metal alloy, a plastic, or any other material suitable for a wheel assembly. Where the MRE assembly 100 is integrated into the wheel assembly 1000, the width of the rim 200 may influence the width of the MRE pillar 110 so that the base 116 of the MRE pillar 110 may be completely disposed on the first surface 220 of the rim 200. In one embodiment, the MRE pillar 110 may engage with the first surface 220 of the rim 200 through the application of adhesives, connectors, screws, bolts or any other arrangement suitable for securing the MRE pillar 110 with the rim 200. In another embodiment, the MRE pillar 110 may be movably fitted between the rim 200 and the tire assembly 900.

In one embodiment, the tire assembly 900 may comprise the inner tire 300 and the outer tire 500. In another embodiment, the tire assembly 900 may simply comprise one tire component such that the MRE assembly 100 can expand within the enclosure between the rim 200 and tire assembly 900, thereby changing the tire pressure. In such an embodiment, the MRE assembly 100 may be in constant contact with the single tire component, may only contact the single tire component when it stiffens upon application of a magnetic field, or may never directly contact the single tire component but be otherwise operable to increase the tire pressure when a magnetic field is applied.

In the embodiment illustrated in FIGS. 1, 2 and 5, the inner tire 300 may comprise a circular band that is disposed between the MRE pillar 110 and the outer tire 500. The inner tire 300 may comprise a rubber material, a metal alloy, or any other material suitable for the wheel assembly 1000, or any combination thereof. Furthermore, the inner tire 300 may comprise a solid piece or may comprise multiple sections distributed about an inner circumference of the wheel assembly 1000. As discussed above, the contact surface 115 of top edge 114 may engage with the MRE pillar surface 310 of the inner tire 300. In one embodiment, the engagement may be loose and/or occur upon activation of the MRE assembly 100. In another embodiment, the engagement may be permanent, such as through the application of adhesives, connectors, screws, bolts or any other arrangements operable to fixedly secure the MRE pillar 110 with the tire assembly 900.

Still referring to FIGS. 1, 2 and 5, the outer tire 500 may comprise an interior wall 510, that in cooperation with inner tire 300, houses a chamber 400. The outer tire 500 may comprise a street surface 520 that contacts a street or road and may comprise treads or other contours to aid in traction. The outer tire 500 may further comprise a thick sturdy rubber material or any other material suitable for a wheel assembly 1000. In one embodiment, the outer tire 500 may comprise metal wire or other support material within a rubber material to provide additional structural support. In another embodiment, the outer tire 500 may comprise multiple layers of different rubber in combination with additional support material.

The street surface 520 of the outer tire 500 may be bound to the interior wall 510 of the outer tire 500 by adhesives, fasteners, moldings or any other connection operable to secure the two components. In the alternative, the street surface 520 and the interior wall 510 may comprise one solid piece as depicted in FIGS. 1, 2 and 5. The interior wall may also comprise a rubber material, additional support material or a combination thereof.

A chamber 400 is disposed internal the wheel assembly 1000 within the outer tire 500. In one embodiment, as depicted in FIGS. 1, 2 and 5, the interior wall 510 may engage the inner tire 300, to define the chamber 400. In another embodiment, where the tire assembly 900 comprises a single tire component, the chamber 400 may be disposed between the rim 200 and the tire assembly 900. The chamber 400 may be pressurized so as to define a tire pressure. The desired tire pressure may depend on multiple factors including, but not limited to, the application of the wheel assembly 1000, the materials comprising the wheel assembly 1000, and the load the wheel assembly 1000 may carry. In one embodiment, the chamber 400 may be divided into multiple chambers, each of which may have its own pressure independent of one another. In such an embodiment, the wheel assembly 1000 may maintain a more constant tire pressure when a leak occurs in a single chamber.

Figure 3:
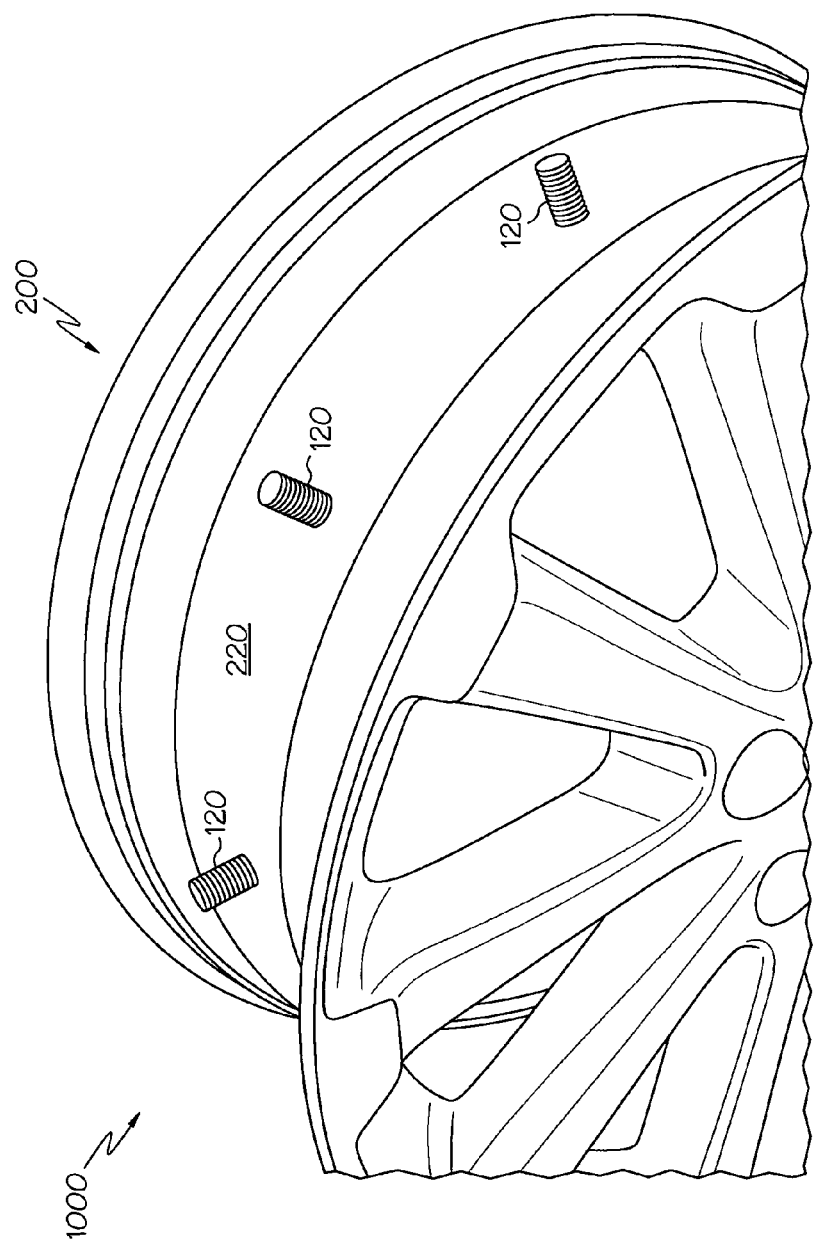
FIG. 3 depicts electromagnets disposed about a first surface of a rim according to one or more embodiments shown and described herein.

Referring to FIGS. 3-5, multiple MRE assemblies 100 may be disposed about the wheel assembly 1000. Each MRE assembly 100 may be disposed within the wheel assembly 1000 such that each MRE pillar 110 is disposed between the tire assembly 900 and the rim 200. In one embodiment, the contact surface 115 of each MRE pillar 110 may engage the MRE pillar surface 310 of the inner tire 300 and the base 116 of each MRE pillar 110 may engage the first surface 220 of the rim 200. Each MRE assembly 100 may house its own electromagnet 120 such that the stiffness of each MRE assembly 100 may be independently controlled. Each MRE assembly 100 may further comprise a magnetic shield 150 disposed about the second surface 210 of the rim 200. In one embodiment, wires 130 may connect the electromagnets 120 to a power source (not shown) such as a vehicle battery.

In operation, the MRE assembly 100 may transition between stiffness levels in response to the applied magnetic field. In one embodiment, an increase in the magnetic field may increase the stiffness of the MRE pillar 110 which will create an added force about the tire assembly 900, illustrated in one embodiment as the inner tire 300. As the inner tire 300 is forced into a direction towards the chamber 400, the added force may assist in resisting external loads applied about the tire (which may also allow for a more constant elevated tire pressure). When the magnetic field is decreased or removed, the MRE pillar 110 may become less stiff and exert less or no force on the inner tire 300. Thus MRE pillar may provide less resistance to external loads applied about the tire. In another embodiment, where the tire assembly 900 comprises a single tire component, the MRE pillar 110 may directly contact the tire assembly 900 at all times. When a magnetic field is applied, the MRE pillar 110 may stiffen such that an added force is applied internal to the tire assembly 900. In the alternative, the MRE pillar 110 may be situated such that when a magnetic field is absent, and the MRE pillar 110 is in a substantially relaxed state, the MRE pillar 110 may not engage the tire assembly 900. However, when a magnetic field is applied to the MRE pillar 110, the MRE pillar 110 may stiffen and engage the tire assembly 900 to increase the tire pressure. In yet another embodiment, the MRE pillar 110 may be disposed internal the chamber 400 such that when it stiffens from a magnetic field it increases the tire pressure (e.g., the air pressure) of the chamber 400, without physical contact.

Referring now to FIGS. 1-6, a feedback control system 700 may dynamically adjust or regulate the overall tire pressure of the wheel assembly 1000 by regulating the stiffness of the MRE assembly 100 through adjusting the stiffness of the MRE pillar 110. Dynamic adjustment or regulation of the tire pressure may comprise automatically adjusting the tire pressure based on external road sensors 751, internal vehicle sensors 752 and/or selectively adjusting the tire pressure based on operator preferences 753. In operation, the condition sensors 750 may communicate with the feedback control system 700 through feedback signals 760. The feedback control system 700 may then communicate control signals 765 to the MRE assembly 100 to control the strength of the magnetic field produced by the electromagnet(s) 120. Thus, when the feedback control system 700 desires a greater tire pressure in the wheel assembly 1000 based on predetermined programs having preset ranges, the feedback control system 700 may send control signals 765 to the MRE assembly 100 to produce a desired magnetic field. If the electromagnet(s) 120 are already producing a magnetic field, and the MRE assembly 100 is at a stiffened condition, the feedback control system 700 may send control signals 765 to the MRE assembly 100 to produce a stronger magnetic field.

As used herein, condition sensors 750 may comprise one of external road sensors 751, internal vehicle sensors 752 and/or operator preferences 753 and combinations thereof and may be operable to send feedback signals 760 to the feedback control system to aid in the determination of the desired tire pressure. External road sensors 751 may comprise sensors with the ability to monitor external driving conditions such as temperature, road grade, driving surface or other parameters that may influence the condition of the drive. For example, external road sensors 751 may be able to identify a road with significant potholes or rough patches where a change in tire pressure may be desired. Internal vehicle sensors 752 may comprise sensors to monitor various operating conditions of the vehicle. For example, internal vehicle sensors 752 may monitor the tire pressure, the speed, the acceleration, or the braking of the vehicle to determine the current driving conditions. In addition, internal vehicle sensors 752 may monitor the roll or pitch of the vehicle to determine whether the driving conditions favor different tire pressures on different sides of the vehicle. In another embodiment, additional sensors may determine the weight of different parts of the vehicle to aid in adjusting the tire pressure to compensate for an additional load in a distinct part of the vehicle. For example, when luggage is added to the trunk of a vehicle, sensors may detect the change in weight distribution causing the rear tire MRE assemblies to adjust independent or in conjunction with the front MRE assemblies. The external road sensors 751 and internal vehicle sensors 752 may enable the feedback control system 700 to automatically adjust the stiffness of the MRE assembly 100.

Operator preferences 753 may further allow the vehicle operator to selectively change the tire pressure as desired. For example, if a vehicle operator determines that a lower than usual tire pressure is desired, or if new tires are installed that require a non-standard tire pressure, the operator may input his or her operator preferences 753 to adjust the tire pressure accordingly.

The three condition sensors 750 may thereby communicate with the feedback control system 700 to allow for the dynamic adjustment of the tire pressure of the wheel assembly 1000. In one embodiment, the dynamic adjustment of the tire pressure may be completely automated by the feedback control system 700. In another embodiment, the feedback control system 700 may require further operator involvement. For example, in one embodiment the feedback control system 700 may request operator permission before it adjusts the tire pressure of the wheel assembly 1000 to the suggested level. Furthermore, where multiple wheel assemblies 1000 with MRE assemblies 100 are present, a single feedback control system 700, or multiple feedback control systems 700, may dynamically adjust the tire pressure of each individual wheel assembly 1000 independent of the others. In one embodiment, the feedback control system 1000 may consider the tire pressure of the other wheel assemblies 1000 when adjusting the tire pressure of a given wheel assembly 1000.

While the feedback control system 700 was described in reference to a vehicle setting, those skilled in the art should appreciate that the feedback control system 700 may also be employed with the wheel assembly 1000 in other alternative environments.

It should now be understood that the MRE assembly as described herein may be used in a wheel assembly to dynamically adjust the tire pressure of the wheel assembly. The use of MRE assemblies with wheel assemblies may further enable the wheel assembly to operate when tire pressure is found to be inadequate or when there is a leak in the tire. Such a wheel assembly may improve the overall performance of a vehicle during operation.

For the purposes of describing and defining the present invention it is noted that the terms "substantially" and "about" are utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments and aspects of the present invention have been illustrated and described herein, various other changes and modifications can be made without departing from the spirit and scope of the invention. Moreover, although various inventive aspects have been described herein, such aspects need not be utilized in combination. It is therefore intended that the appended claims cover all such changes and modifications that are within the scope of this invention.

What is claimed is:

1. A wheel assembly comprising:
   a rim;
   a tire assembly engaged with the rim, the tire assembly comprising an inner tire and an outer tire, wherein the outer tire comprises an interior wall that cooperates with the inner tire to form a chamber;
   a magneto-rheological elastomer (MRE) assembly disposed between the rim and the outer tire, wherein the MRE assembly is configured to adjust a tire pressure within the chamber and engage the inner tire when a magnetic field is applied to the MRE assembly.

2. The wheel assembly of claim 1, further comprising a second MRE assembly disposed between the rim and the outer tire, wherein each MRE assembly has an independently controlled stiffness.

3. The wheel assembly of claim 1 wherein an electromagnet configured to produce an adjustable magnetic field is disposed about the MRE assembly.

4. The wheel assembly of claim 3 wherein a magnetic shield is disposed proximate the electromagnet to at least partially surround a portion of the electromagnet.

5. The wheel assembly of claim 1 wherein the MRE assembly is adjustable in response to feedback from condition sensors.

6. The wheel assembly of claim 5 wherein the condition sensors comprise external road sensors, internal vehicle sensors and combinations thereof.

7. A wheel assembly comprising:
   a rim;
   an outer tire disposed around the rim, wherein the outer tire at least partially encloses a chamber; and
   a magneto-rheological elastomer (MRE) assembly disposed between the rim and the outer tire, the MRE assembly comprising an MRE pillar having a side wall and a top and an electromagnet at least partially surrounded by the MRE pillar, wherein when the MRE assembly is subjected to a magnetic field, the MRE assembly exerts a force on the chamber.

8. The wheel assembly of claim 7 wherein the side wall of the MRE pillar is substantially cylindrical.

9. The wheel assembly of claim 7 wherein the wheel assembly comprises an inner tire, the chamber has a tire pressure, and the chamber is disposed between the outer tire and the inner tire.

10. The wheel assembly of claim 9 wherein a contact surface of the top edge of the MRE pillar engages the inner tire of the wheel assembly.

11. The wheel assembly of claim 9 wherein the inner tire is a solid circular band.

12. The wheel assembly of claim 7 wherein the electromagnet applies a substantially symmetric magnetic field to the MRE pillar.

13. The wheel assembly of claim 7 wherein the MRE assembly is adjustable in response to feedback from condition sensors.

14. The wheel assembly of claim 13 wherein the condition sensors comprise at least a tire pressure monitoring system.

15. The wheel assembly of claim 7 wherein the MRE assembly is adjustable in response to operator input.

16. A vehicle with a dynamically adjustable tire pressure system, the vehicle comprising:
   a wheel assembly comprising a rim, a tire assembly having an inner tire and an outer tire, wherein the outer tire comprises an interior wall that cooperates with the inner tire to form a chamber, and a magneto-rheological elastomer (MRE) assembly between the rim and the inner tire, the MRE assembly comprising an electromagnet and an MRE pillar, wherein the MRE pillar comprises a side wall that at least partially surrounds the electromagnet; and, a feedback control system in communication with a condition sensor and the MRE assembly, wherein when the feedback control system receives feedback signals from the condition sensor that a tire pressure is outside a preset range, the feedback control system produces a control signal to control an output of the electromagnet.

17. The vehicle of claim 16 wherein the condition sensors comprise at least a tire pressure monitoring system.

18. The vehicle of claim 16 wherein the condition sensors includes external road sensors, internal vehicle sensors and combinations thereof.

19. The vehicle of claim 16 wherein the feedback control system requests operator permission before adjusting the tire pressure.

20. The vehicle of claim 16 wherein multiple wheel assemblies comprise MRE assemblies, each wheel assembly being independently configured to adjust its tire pressure.

* * * * *